United States Patent
Seo et al.

(10) Patent No.: US 9,645,423 B2
(45) Date of Patent: May 9, 2017

(54) LIQUID CRYSTAL DISPLAY DEVICE

(71) Applicant: LG DISPLAY CO., LTD., Seoul (KR)

(72) Inventors: Byung Hyuck Seo, Goyang-si (KR); Ji Gon Kim, Anyang-si (KR); Ju Hye Hong, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/570,959

(22) Filed: Dec. 15, 2014

(65) Prior Publication Data

US 2015/0277180 A1   Oct. 1, 2015

(30) Foreign Application Priority Data

Mar. 31, 2014   (KR) ........................ 10-2014-0037587

(51) Int. Cl.
  *G02F 1/1333* (2006.01)
  *G02F 1/1335* (2006.01)
  *G02F 1/133* (2006.01)
  *G02F 1/1339* (2006.01)

(52) U.S. Cl.
  CPC ...... *G02F 1/133308* (2013.01); *G02F 1/1339* (2013.01); *G02F 1/13306* (2013.01); *G02F 1/133504* (2013.01); *G02F 1/133528* (2013.01); *G02F 1/133602* (2013.01); *G02F 1/133608* (2013.01); *G02F 2001/13332* (2013.01); *G02F 2001/133314* (2013.01)

(58) Field of Classification Search
  CPC ......... G02F 1/133602; G02F 1/133608; G02F 1/133308
  USPC .............................................. 349/60, 58, 64
  See application file for complete search history.

(56) References Cited

U.S. PATENT DOCUMENTS

| | | | | |
|---|---|---|---|---|
| 2008/0018826 A1* | 1/2008 | Bae | .................. | G02F 1/133308 349/58 |
| 2008/0291354 A1* | 11/2008 | Oh | .................. | G02F 1/133308 349/58 |
| 2010/0253873 A1* | 10/2010 | Kretz | ................ | G02F 1/133308 349/58 |

* cited by examiner

*Primary Examiner* — Wen-Ying P Chen
(74) *Attorney, Agent, or Firm* — Birch, Stewart, Kolasch & Birch, LLP

(57) ABSTRACT

Discussed is a liquid crystal display device which provides a simple structure by minimizing structural and optical components. The liquid crystal display (LCD) device can include a liquid crystal display panel that includes a lower substrate and an upper substrate bonded to each other with a liquid crystal layer interposed therebetween; a rear cover that includes a bottom supporter supporting a light source module emitting light toward a bottom of the liquid crystal display panel, an upper supporter supporting a lower edge of the liquid crystal display panel, and a sidewall between the bottom supporter and the upper supporter; a diffusion sheet arranged below the liquid crystal display panel to cover the bottom supporter of the rear cover; and a sheet attachment member provided at the edge of the diffusion sheet and attached to the bottom of the liquid crystal display panel.

16 Claims, 11 Drawing Sheets

LIQUID CRYSTAL DISPLAY DEVICE

CROSS REFERENCE TO RELATED APPLICATIONS

This application claims the benefit of the Korean Patent Application No. 10-2014-0037587 filed on Mar. 31, 2014, which is hereby incorporated by reference as if fully set forth herein.

BACKGROUND OF THE INVENTION

Field of the Disclosure

Embodiments of the present invention relate to a liquid crystal display device, and more particularly, to a liquid crystal display device which facilitates a simple structure by partially removing structural and optical components.

Discussion of the Related Art

A liquid crystal display (LCD) device is a device for displaying information through the use of light modulation in a liquid crystal cell. As a voltage is applied to a specific alignment of liquid crystal molecules included in the LCD device, the specific alignment of liquid crystal molecules is changed to another alignment. Thus, the LCD device converts a change of optical properties such as birefringence, optical rotatory power, dichroism and light scattering properties in the liquid crystal cell into a visual change. The LCD device includes a backlight unit provided below a liquid crystal display panel. In this case, an image is displayed on the liquid crystal display panel by light emitted from the backlight unit.

FIG. 1 is a cross sectional view illustrating a related art LCD device.

Referring to FIG. 1, the related art LCD device may include a liquid crystal display panel 10, a guide panel 20, a rear cover 30, a plurality of light source modules 40, a diffusion plate 50, an optical sheet 60, and a front case 70.

The liquid crystal panel 10 may include lower and upper substrates 11 and 13 bonded to each other with a liquid crystal layer (not shown) interposed therebetween, a lower polarizing film 15 attached to a rear surface of the lower substrate 11, and an upper polarizing film 17 attached to a front surface of the upper substrate 13.

The guide panel 20 supports a rear edge of the liquid crystal display panel 10, and covers a lateral surface of the liquid crystal display panel 10. To this end, the guide panel 20 may include a guide sidewall 21 for covering each lateral surface of the liquid crystal display panel 10, and a panel placing portion 23 formed in a square-shaped frame protruding from an inner surface of the guide sidewall 21, wherein the panel placing portion 23 is provided in the square-shaped frame with a predetermined thickness so as to support the rear edge of the liquid crystal display panel 10.

The rear cover 30 receives the plurality of light source modules 40 therein, and also supports the diffusion plate 50, the optical sheet 60 and the guide panel 20. In this case, the rear cover 30 may include a bottom supporter, an inclined portion inclined at a predetermined height from a bottom surface, and an upper supporter provided in an upper side of the inclined portion and formed with a predetermined width while being parallel to the bottom supporter.

The plurality of light source modules 40 are arranged at fixed intervals on the bottom supporter of the rear cover 30, wherein a distance between each of the light source modules 40 is fixed to 'D1', as shown in FIG. 1. For example, each of the light source modules 40 may include a light emitting diode.

The diffusion plate 50 is formed of a flat plate shape having a predetermined thickness. The diffusion plate 50 is placed onto the upper supporter of the rear cover 30 so that the diffusion plate 50 covers a front surface of the rear cover 30 with the plurality of light source modules 40 received therein, whereby light being incident from the plurality of light source modules 40 is diffused and advanced toward the liquid crystal display panel 10. Each lateral surface of the diffusion plate 50 is surrounded by the guide sidewall 21 of the guide panel 20 so that a position of the diffusion plate 50 is fixedly maintained by the guide panel 20.

The optical sheet 60 is provided on the diffusion plate 50, and the optical sheet 60 improves luminance properties of light being incident from the diffusion plate 50 and provides the light with improved luminance properties toward the liquid crystal display panel 10. To this end, the optical sheet 60 may include a lower light-condensing sheet 61, an upper light-condensing sheet 63, and a diffusion sheet 65. Each lateral surface of the optical sheet 60 is surrounded by the guide sidewall 21 so that a position of the optical sheet 60 is fixedly maintained by the guide panel 20.

The front case 70, which is connected with the guide sidewall 21 of the guide panel 20, surrounds a front edge of the liquid crystal display panel 10 and each lateral surface of the guide panel 20, thereby fixedly maintaining a position of the liquid crystal display panel 10 supported by the guide panel 20.

However, the related art LCD device has the following disadvantages.

First, the related art LCD device inevitably requires the components such as the guide panel 20 for supporting the liquid crystal display panel 10 and fixing the position of the optical component such as the diffusion plate 50 and optical sheet 60, whereby the number of components is increased. Due to the increased number of components included in the related art LCD device, the yield is lowered and manufacturing cost is increased.

Also, a gap space (G) is prepared between the liquid crystal display panel 10 and the optical sheet 60 due to the panel placing portion 23 of the guide panel 20. Thus, Mura defects may occur due to a contact between the liquid crystal display panel 10 and the optical sheet 60 in accordance with a thermal expansion of each of the liquid crystal display panel 10 and the relatively-thick diffusion plate 50.

SUMMARY OF THE INVENTION

Accordingly, the embodiments of the present invention are directed to a liquid crystal display device that substantially obviates one or more problems due to limitations and disadvantages of the related art.

An aspect of the embodiments of the present invention is directed to provide a liquid crystal display device which facilitates a simple structure by minimizing structural and optical components.

Another aspect of the embodiments of the present invention is directed to provide a liquid crystal display device which prevents Mura defects caused by a contact between a liquid crystal display panel and an optical sheet.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a liquid crystal display (LCD) device comprising a liquid crystal display panel that includes a lower substrate and an upper substrate bonded to each other with a liquid crystal layer interposed therebetween; a rear cover that includes a bottom supporter supporting a light source module emitting light toward a bottom of the liquid crystal display panel, an upper supporter supporting a lower edge of the liquid crystal display panel, and a sidewall between the bottom supporter and the upper supporter; a diffusion sheet arranged below the liquid crystal display panel to cover the bottom supporter of the rear cover; a sheet attachment member provided at the edge of the diffusion sheet and attached to the bottom of the liquid crystal display panel; an optical sheet arranged between the liquid crystal display panel and the diffusion sheet; and a panel connection member connected to a lower edge of the liquid crystal display panel and also connected to the upper supporter of the rear cover.

In another aspect of the present invention, there is provided a liquid crystal display (LCD) device, which includes a rear cover provided with a light source module emitting light, a diffusion sheet covering the rear cover, an optical sheet arranged on the diffusion sheet, and a liquid crystal display panel arranged on the optical sheet, the LCD device comprising a sheet attachment member attached to the edge of the diffusion sheet and also attached to a bottom of the liquid crystal display panel; and a panel connection member connected to a lower edge of the liquid crystal display panel and also connected to the rear cover, wherein the diffusion sheet is attached to the liquid crystal display panel by the sheet attachment and supports the optical sheet.

The liquid crystal display panel may include lower and upper substrates bonded to each other with a liquid crystal layer interposed therebetween and a lower polarizing film attached to the lower substrate, and the diffusion sheet may be attached to the lower polarizing film by the sheet attachment member.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

On explanation about the embodiments of the present invention, the following details about the terms should be understood.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of the two or more elements selected from the first, second and third elements as well as each element of the first, second and third elements. Also, if it is mentioned that a first element is positioned "on or above" a second structure, it should be understood that the first and second elements may be brought into contact with each other, or a third element may be interposed between the first and second elements.

Hereinafter, a liquid crystal display (LCD) device according to the embodiments of the present invention will be described in detail with reference to the accompanying drawings.

Figure 2:
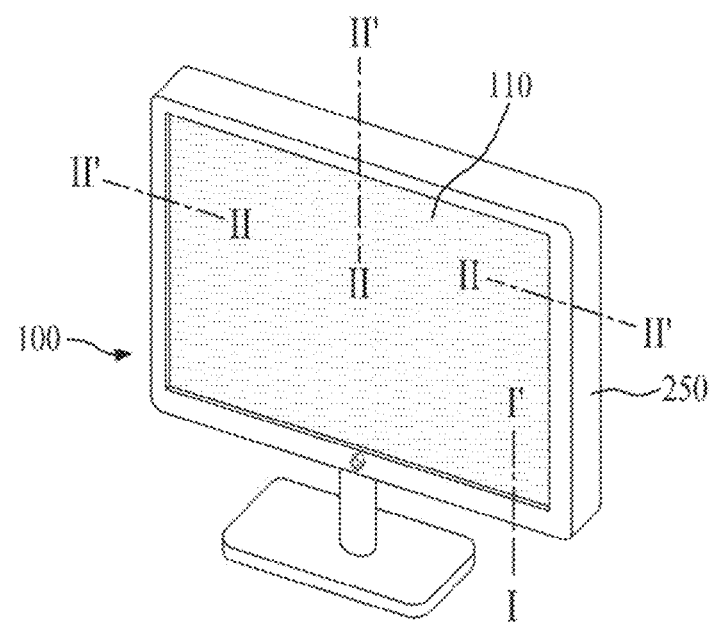
FIG. 2 illustrates an LCD device according to a first embodiment of the present invention.
Figure 3:
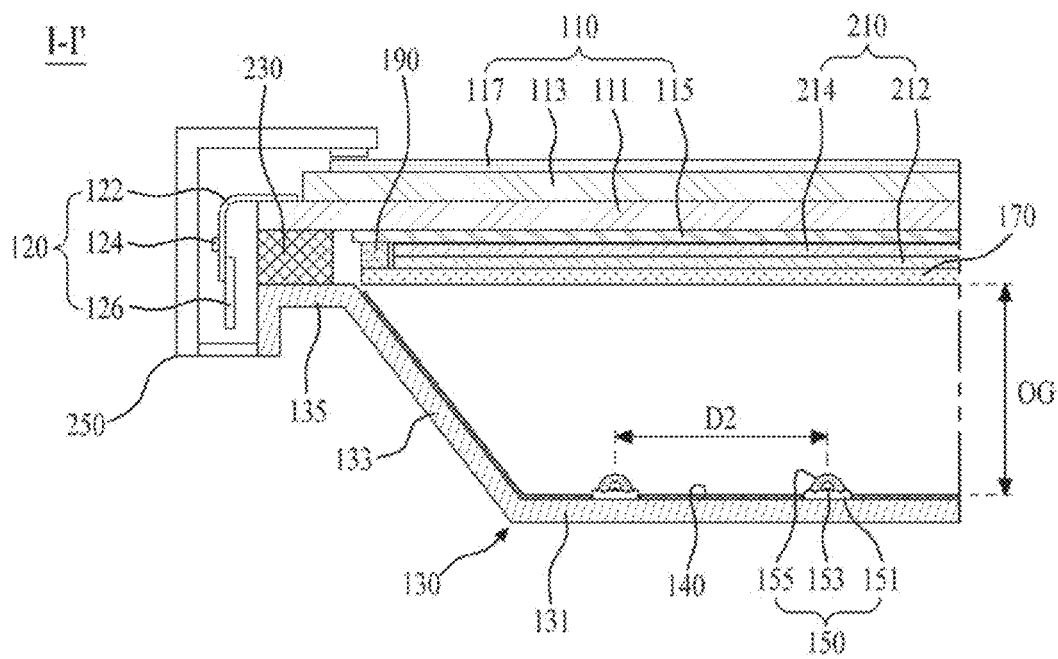
FIG. 3 is a cross-sectional view along line I-I' of FIG. 2.
Figure 4:
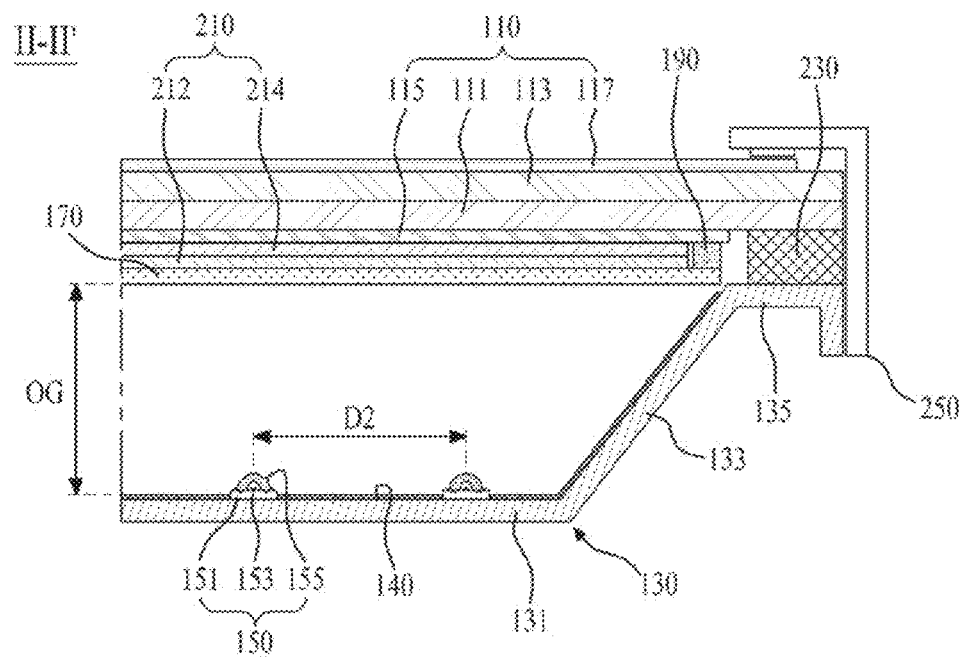
FIG. 4 is a cross-sectional view along line II-II' of FIG. 2.

FIG. 2 illustrates an LCD device according to the first embodiment of the present invention, FIG. 3 is a cross-sectional view along I-I' of FIG. 2, and FIG. 4 is a cross-sectional view along II-II' of FIG. 2.

Referring to FIGS. 2 to 4, the LCD device 100 according to the first embodiment of the present invention may include a liquid crystal display panel 110, a rear cover 130, a plurality of light source modules 150, a diffusion sheet 170, a sheet attachment member 190, an optical sheet 210, a panel connection member 230, and a front cover 250.

The liquid crystal display panel 110 controls light transmittance of light which is incident from the plurality of light source modules 150, whereby a predetermined image is displayed on the liquid crystal display panel 110. To this end, the liquid crystal display panel 110 may include a lower substrate 111, an upper substrate 113, a lower polarizing film 115, and an upper polarizing film 117.

On the lower substrate 111, there are a plurality of gate and data lines crossing each other, and a plurality of pixels formed at every crossing area of the gate and data lines. Each pixel may include a thin film transistor connected with the gate and data lines, a pixel electrode connected with the thin film transistor, and a common electrode formed adjacent to the pixel electrode and supplied with a common voltage. The lower substrate 111 controls light transmittance of a liquid crystal layer by forming an electric field corresponding to a differential voltage between common and data voltages applied to each pixel. In a lower circumference (or upper circumference) of the lower substrate 111, there is a pad region including a signal apply pad connected with the plurality of data lines. Also, there is a gate driving circuit for supplying a gate signal to the plurality of gate lines in a left and/or right circumference of the lower substrate 111, wherein the gate driving circuit is formed by a thin film transistor process.

The upper substrate 113 is smaller than the lower substrate 111, and a liquid crystal layer is interposed between the lower substrate 111 and the upper substrate 113. Thus, the entire area of the upper substrate 113 is bonded to the remaining areas of the lower substrate 111 except the pad region. On the upper substrate 113, there is a color filter corresponding to each pixel. In addition, a common electrode supplied with the common voltage in accordance with a driving method of liquid crystal layer may be additionally formed on the upper substrate 113.

A detailed structure of the lower and upper substrates 111 and 113 may be changed to various types generally known to those in the art in accordance with mode, for example, Twisted Nematic (TN) mode, Vertical Alignment (VA) mode, In Plane Switching (IPS) mode, Fringe Field Switching (FFS) mode, and etc.

The lower polarizing film 115 is attached to a lower surface of the lower substrate 111, wherein the lower polarizing film 115 polarizes the light being incident on the lower substrate 111. In this case, the lower polarizing film 115 may be attached to the entire area of the lower surface of the lower substrate 111, or may be attached to the remaining area except a lower edge of the lower substrate 111.

The upper polarizing film 117 is attached to a front surface of the upper substrate 113, and the upper polarizing film 117 polarizes the light which is emitted to the outside via the upper substrate 113.

An orientation direction in the lower polarizing film 115 by an orientation process is opposite to an orientation direction in the upper polarizing film 117 by an orientation process, whereby a polarizing function of the lower polarizing film 115 is different from a polarizing function of the upper polarizing film 117. That is, a direction of shrinkage force in the lower polarizing film 115 by the orientation process is opposite to a direction of shrinkage force in the upper polarizing film 117 by the orientation process. As the lower polarizing film 115 and the upper polarizing film 117 are respectively attached to the lower substrate 111 and the upper substrate 113, the shrinkage forces of the lower polarizing film 115 and the upper polarizing film 117 are offset from each other, whereby the liquid crystal display panel 110 is maintained in a flat state without being bent upward or downward.

Additionally, a panel driver 120 for driving each pixel is connected with the pad region of the lower substrate 111. The panel driver 120 may include a flexible printed circuit film 122 attached to the pad region, a driving integrated circuit 124 provided in the flexible printed circuit film 122, and a data printed circuit board 126 connected with the flexible printed circuit film 122.

The panel driver 120 may display 2-dimensional (2D) or 3-dimensional (3D) image on the liquid crystal display panel 110 in accordance with a display mode. In order to display the 3D image on the liquid crystal display panel 110, the LCD device according to the present invention may further include a 3D-image optical member attached to the upper polarizing film 117 or interposed between the upper polarizing film 117 and the upper substrate 113. The 3D-image optical member may be formed of a retarder film including a left-eye retarder pattern and a right-eye retarder pattern to provide the 3D image to a viewer in accordance with a polarized glasses mode, or may be formed of a lens film having a lens pattern to provide the 3D image a viewer in accordance with a glassless mode.

The rear cover 130, which is arranged in a lower side of the liquid crystal display panel 110, supports the liquid crystal display panel 110, and also covers a rear surface of the liquid crystal display panel 110. According to one embodiment of the present invention, the rear cover 130 provides a space having a groove with a predetermined depth, which corresponds to the remaining portions except an edge overlapped with a border of the liquid crystal display panel 110. Thus, the plurality of light source modules 150 are received in the space of the rear cover 130, and the border of the liquid crystal display panel 110 is supported by the edge of the rear cover 130. For example, the rear cover 130 may include a bottom supporter 131, a sidewall 133, and an upper supporter 135.

The bottom supporter 131 confronts the remaining portions except the border of the liquid crystal display panel 110, and supports the plurality of light source modules 150.

The sidewall 133 is bent from each side of the bottom supporter 131 so as to provide the space on the bottom supporter 131. That is, the sidewall 133 is provided at a predetermined height from each side of the bottom supporter 131 so that the sidewall 133 surrounds an upper side of the bottom supporter 131. In this case, the sidewall 133 may be inclined at a predetermined angle from each side of the bottom supporter 131.

The upper supporter 135 is provided in parallel to the bottom supporter 131, and is bent from an upper end of the sidewall 133 so as to support a lower edge of the liquid crystal display panel 110.

Then, a reflective sheet 140 is attached to upper surfaces of the bottom supporter 131 and the sidewall 133.

The plurality of light source modules 150 are arranged on the bottom supporter 131 of the rear cover 130, wherein a distance between each of the light source modules 150 is fixed to 'D2'. The plurality of light source modules 150 emit the light toward the diffusion sheet 170. According to one embodiment of the present invention, the plurality of light source modules 150 may include a light-source printed circuit board 151, a point light source package 153, and a light diffusion lens 155.

The plurality of light-source printed circuit boards 151 may be arranged at fixed intervals on the bottom supporter 131 of the rear cover 130. In this case, a backlight driving signal line and a connector are provided in the light-source printed circuit board 151, and the light-source printed circuit board 151 is connected with an externally-provided backlight driving circuit through a connector.

The plurality of point light source packages 153 may be arranged at fixed intervals, and are respectively provided on the plurality of light-source printed circuit boards 151. According as the point light source package 153 is electrically connected with the backlight driving signal line, the point light source package 153 emits light by a backlight driving signal supplied from the backlight driving signal line. The point light source package 153 may include a light-emitting diode driving chip.

The light diffusion lens 155, which is provided on the light-source printed circuit board 151, covers the point light source package 153. The light diffusion lens 155 diffuses the light emitted from the point light source package 153, whereby a central luminance of the light source module 150 is dispersed so that it is possible to prevent a hot spot and to increase a light emission area. For example, the light diffusion lens 155 may have various cross sectional shapes such as semi-spherical shape or semi-spherical shape with a central groove, but not limited to theses shapes. The light diffusion lens 155 may be formed in any shape enabling to diffuse the light.

The distance 'D2' between each of the light source modules 150 may be defined by a pitch between central points of the neighboring point light source packages 153. The distance 'D2' may be set by an optical gap (OG) between the upper surface of the light-source printed circuit board 151 and the reflective sheet 140 in order to realize the uniform luminance in the entire area of the liquid crystal display panel 110.

The diffusion sheet 170 is provided in the lower side of the liquid crystal display panel 110 so as to cover the bottom supporter 131 of the rear cover 130 so that the light being from the plurality of light source modules 150 is diffused. The diffusion sheet 170 substitutes for a related art diffusion plate. The diffusion sheet 170 may include at least one of haze, light diffusion pattern and light diffusion member, wherein the diffusion sheet 170 may be relatively thinner than the related art diffusion plate.

The sheet attachment member 190 is formed along the circumstance of the diffusion sheet 170 so that the diffusion sheet 170 is attached to the lower surface of the liquid crystal display panel 110, whereby the diffusion sheet 170 is connected with the liquid crystal display panel 110 as one body. In this case, an upper surface of the sheet attachment member 190 attached to the liquid crystal display panel 110 may be attached to the circumference of lower surface of the lower substrate 111 or the circumference of lower surface of the lower polarizing film 115. That is, in consideration of a thermal expansion in each of the lower polarizing film 115 and the diffusion sheet 170, the sheet attachment member 190 is attached to the lower polarizing film 115 so that the sheet attachment member 190 is thermally expanded together with the lower polarizing film 115 and the diffusion sheet 170, preferably. The sheet attachment member 190 may be photocurable adhesive, thermosetting adhesive, double-sided tape, or double-sided adhesive pad.

Figure 5:
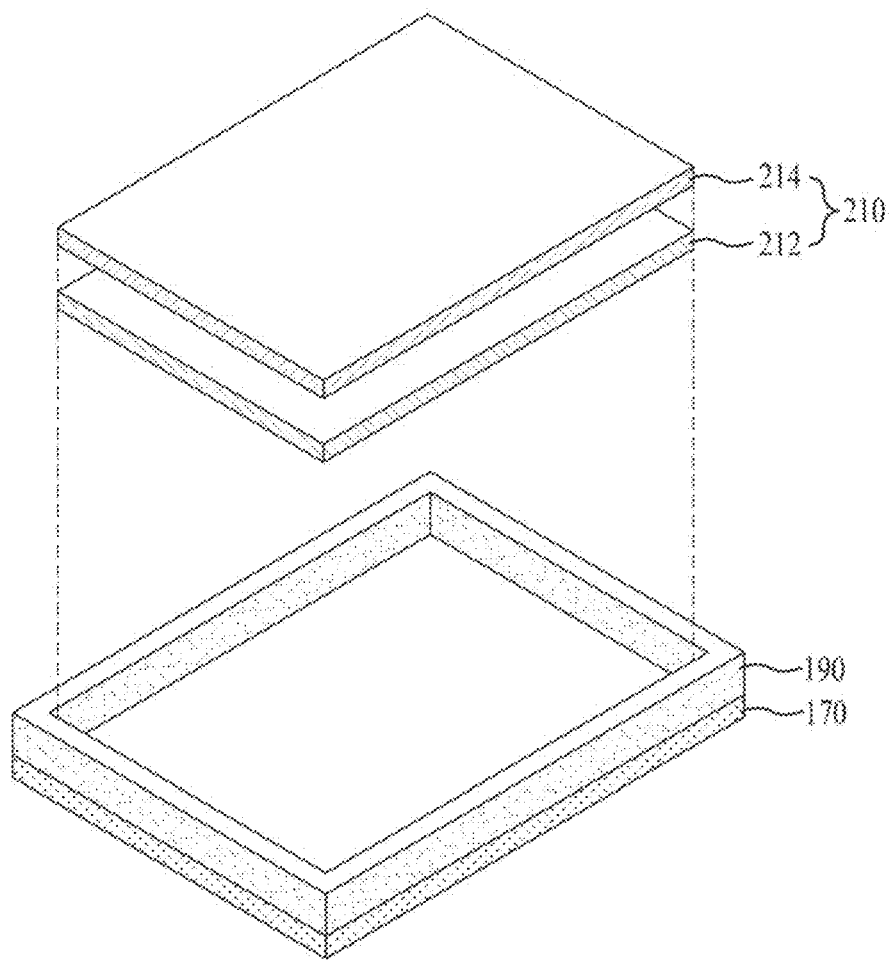
FIG. 5 illustrates a diffusion set, a sheet attachment member, and an optical sheet, which are shown in FIGS. 3 and 4.

In order to prevent foreign matter or moisture from being permeated into the inside through a gap between the liquid crystal display panel 110 and the diffusion sheet 170, the sheet attachment member 190 may be provided with a sealing space prepared between the liquid crystal display panel 110 and the diffusion sheet 170. To this end, as shown in FIG. 5, the sheet attachment member 190 may be formed in a closed-loop type along the circumference of the diffusion sheet 170. In this case, the sheet attachment member 190 may be formed of photocurable adhesive or thermosetting adhesive, preferably.

The optical sheet 210 is smaller than the diffusion sheet 170. The optical sheet 210 is inserted into the gap space (or sealing space) prepared between the lower polarizing film 115 of the liquid crystal display panel 110 and the diffusion sheet 170 by the sheet attachment member 190, and is supported by the diffusion sheet 170. Preferably, the optical sheet 210 is not attached to the lower surface of the lower polarizing film 115, but is disposed adjacent to the lower surface of the lower polarizing film 115 at maximum. In case of the thermal expansion of the liquid crystal display panel 110, the entire area of the liquid crystal display panel 110 is brought into surface-contact with the entire area of the optical sheet 210 so that it is possible to prevent Mura defects caused by a local contact between the liquid crystal display panel 110 and the optical sheet 210. Meanwhile, if the optical sheet 210 is attached to the entire lower surface of the lower polarizing film 115, it inevitably requires an additional transparent adhesive. If using the transparent adhesive, it has little refractive index so that an optical function of the optical sheet 210 is lowered.

Figure 6A:
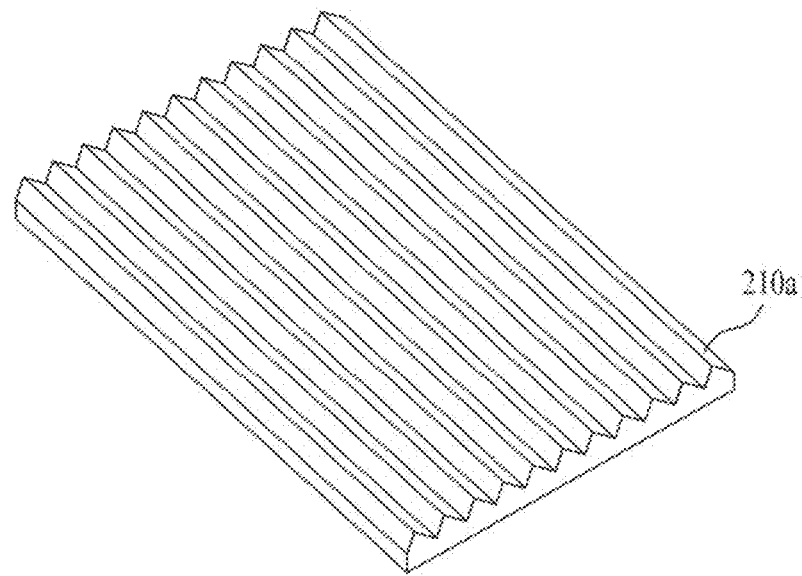
FIGS. 6A to 6C illustrate sheets constituting an optical sheet shown in FIGS. 3 and 4.
Figure 6B:
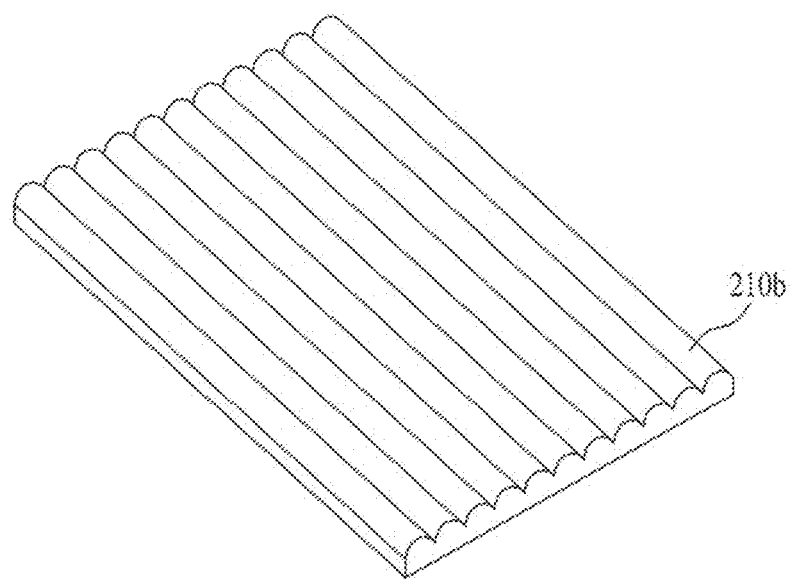
Figure 6C:
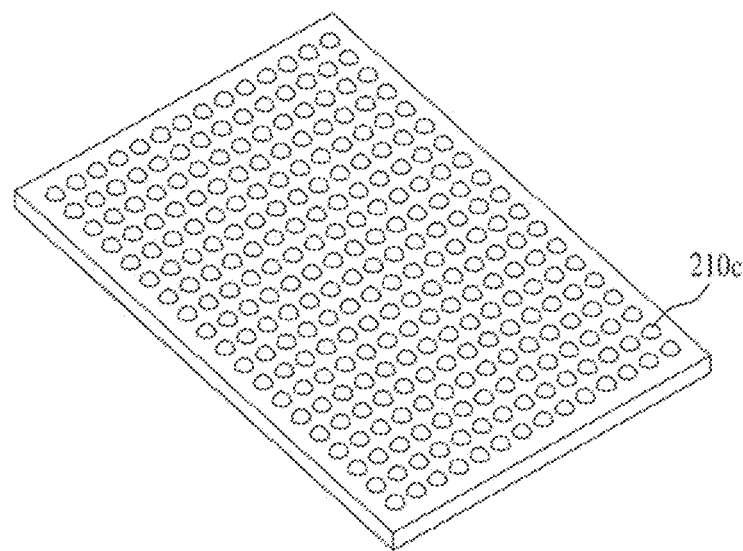

The optical sheet 210 may include at least one of prism sheet, lenticular lens sheet and micro lens sheet. For example, as shown in FIG. 6A, the prism sheet may include a plurality of prism patterns 210a provided in parallel, wherein each prism pattern 210a included in the prism sheet may have a triangular-shaped cross section. In this case, the peak and valley of the prism pattern 210a may be rounded. For example, as shown in FIG. 6B, the lenticular lens sheet may include a plurality of lenticular lens patterns 210b provided in parallel, wherein each lenticular lens pattern 210b included in the lenticular lens sheet may have a semicircle or semiellipse cross section with a predetermined curvature. For example, as shown in FIG. 6C, the micro lens sheet may include a plurality of micro lens patterns 210c, wherein each micro lens pattern 210c may have a semicircle or semiellipse cross section with a predetermined height. Preferably, each pattern 210a, 210b and 210c included in the prism sheet, lenticular lens sheet and micro lens sheet is smaller than each pixel formed in the liquid crystal display panel 110 in order to prevent Moire effects caused by a light interference.

The optical sheet 210 according to one embodiment of the present invention may include first and second lenticular lens sheets 212 and 214 deposited on the diffusion sheet 170. In this case, a length direction of the plurality of lenticular lens patterns formed in the first lenticular lens sheet 212 may be the same as a length direction of the plurality of lenticular lens patterns formed in the second lenticular lens sheet 214, or a length direction of the plurality of lenticular lens patterns formed in the first lenticular lens sheet 212 may intersect with a length direction of the plurality of lenticular lens patterns formed in the second lenticular lens sheet 214.

Referring once again to FIGS. 2 to 4, the panel connection member 230 connects the circumference of lower surface of the liquid crystal display panel 110 with the upper supporter 135 of the rear cover 130. The panel connection member 230 may be photocurable adhesive, thermosetting adhesive, double-sided tape, or double-sided adhesive pad. The panel connection member 230 may be attached to the circumference of the lower substrate 111 of the liquid crystal display panel 110 or the circumference of the lower polarizing film 115. In consideration of connection strength and thermal expansion, the panel connection member 230 is attached to the lower substrate 111, preferably. Especially, if the panel connection member 230 is attached to the circumference of lower surface of the lower substrate 111, each lateral surface of the lower polarizing film 115 is surrounded by the panel connection member 230 so that it is possible to prevent the light incident on the lower polarizing film 115 from being emitted to the outside by a total internal reflection of the lower polarizing film 115, thereby preventing light leakage in the lateral side.

The front cover 250 is formed in a rectangular frame whose cross section is formed in shape of "Γ", and is connected with the rear cover 130, whereby the front cover 250 covers a front edge of the liquid crystal display panel 110 and each lateral surface of the rear cover 130. In this case, the front cover 250 may be connected with the rear cover 130 by a lateral connection method using a coupling member such as screw or hook, whereby the front cover 250 covers the front edge of the liquid crystal display panel 110, and also prevents the panel driver 120 and the panel connection member 230 from being exposed to the outside of the LCD device.

As described above, in case of the LCD device according to the first embodiment of the present invention, the diffusion sheet 170 is attached to the circumference of the lower surface of the liquid crystal display panel 110, and the liquid crystal display panel 110 with the relatively-thin diffusion sheet 170 attached thereto is connected with the rear cover 130. As a result, it is possible to remove the related art diffusion plate and guide panel, which are necessarily required in the related art LCD device, from the LCD device according to the first embodiment of the present invention. Accordingly, the LCD device according to the first embodiment of the present invention simplifies the structure of the LCD device by decreasing the structural and optical components, and also prevents Mura defects caused by the contact between the liquid crystal display panel 110 and the optical sheet 210 in accordance with the thermal expansion of the relatively-thick diffusion plate.

Also, in case of the LCD device according to the first embodiment of the present invention, the optical sheet 210 is provided in the sealing space prepared between the liquid crystal display panel 110 and the diffusion sheet 170 so that it is possible to prevent interference defects of components and a separation of the optical sheet 210 during an experiment for mechanical reliability such as vibration or shock, and also to prevent permeation of foreign matter or moisture by the use of sealing space, that is, to prevent the optical sheet 210 from being wrinkled by permeation of foreign matter or moisture, and furthermore to prevent Mura defects which might occur under the circumstance of high-temperature and humidity.

Figure 7:
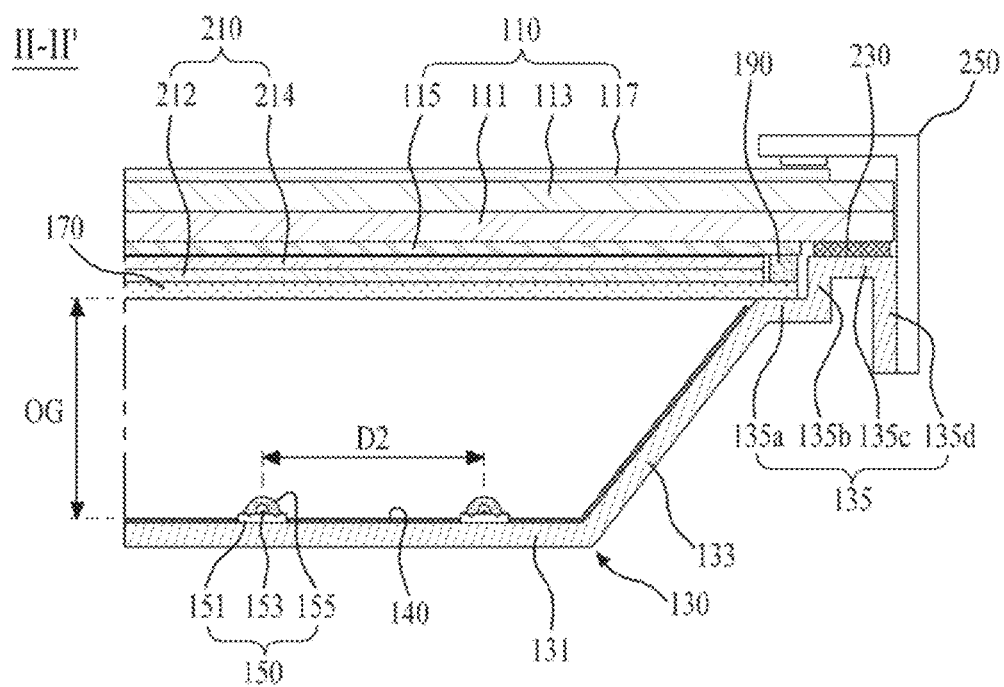
FIG. 7 illustrates a modified example of the LCD device according to the first embodiment of the present invention, which is obtained by changing the structure of a rear cover.

FIG. 7 illustrates a modified example of the LCD device according to the first embodiment of the present invention, which is obtained by changing the structure of rear cover. Hereinafter, only the structure of rear cover will be described in detail.

As described above, the rear cover 130 may include a bottom supporter 131, a sidewall 133, and an upper supporter 135.

The bottom supporter 131 confronts the remaining portions except the border of liquid crystal display panel 110, and supports a plurality of light source modules 150.

The sidewall 133 is bent from each side of the bottom supporter 131 so as to provide the space on the bottom supporter 131. That is, the sidewall 133 is provided at a predetermined height from each side of the bottom supporter 131 so that the sidewall 133 surrounds an upper side of the bottom supporter 131. In this case, the sidewall 133 may be inclined at a predetermined angle from each side of the bottom supporter 131.

The upper supporter 135 is provided in parallel to the bottom supporter 131, and is formed in a step shape while being connected with an upper end of the sidewall 133. The upper supporter 135 supports a lower edge of a diffusion sheet 170 attached to the liquid crystal display panel 110, and also supports a lower edge of the liquid crystal display panel 110. To this end, the upper supporter 135 may include a sheet support portion 135a, an upper sidewall 135b, and a panel support portion 135c.

The sheet support portion 135a is provided at the upper end of the sidewall 133 to have a predetermined width while being parallel to the bottom supporter 131, to thereby support the lower edge of the diffusion sheet 170 attached to the liquid crystal display panel 110. Accordingly, a receiving space of a rear cover 130 is perfectly covered by the diffusion sheet 170 so that it is possible to prevent light leakage in a gap between the rear cover 130 and the diffusion sheet 170, thereby improving light efficiency.

The upper sidewall 135b is bent from an end of the sheet support portion 135a, and is provided with a predetermined height, whereby the upper sidewall 135b surrounds each lateral side of the sheet attachment member 190 and the diffusion sheet 170 supported by the sheet support portion 135. The upper sidewall 135b decreases an interval between the panel support portion 135c and the liquid crystal display panel 110.

The panel support portion 135c is provided at a predetermined width while being parallel to the bottom supporter 131 and being connected with an upper end of the upper sidewall 135b, to thereby support the lower edge of the liquid crystal display panel 110. The panel support portion 135c is connected with the aforementioned panel connection member 230, to thereby support the liquid crystal display panel 110.

The upper supporter 135 may further include a cover sidewall 135d. The cover sidewall 135d is downwardly bent from an end of the panel support portion 135c while being in parallel to the upper sidewall 135b. The cover sidewall 135d is connected with the aforementioned front cover 250, and is surrounded by the front cover 250.

Accordingly, the upper supporter 135 supports the diffusion sheet 170 through the use of sheet support portion 135a, upper sidewall 135b and panel support portion 135c formed in the step shape, and also supports the liquid crystal display panel 110 through the use of panel support portion 135c, thereby preventing light leakage in the lateral side of the diffusion sheet 170, and enhancing stiffness of the rear cover 130. Also, the upper supporter 135 enables to decrease the interval between the liquid crystal display panel 110 and the panel support portion 135c through the upper sidewall 135b, thereby facilitating the formation of the panel connection member 230.

Figure 8:
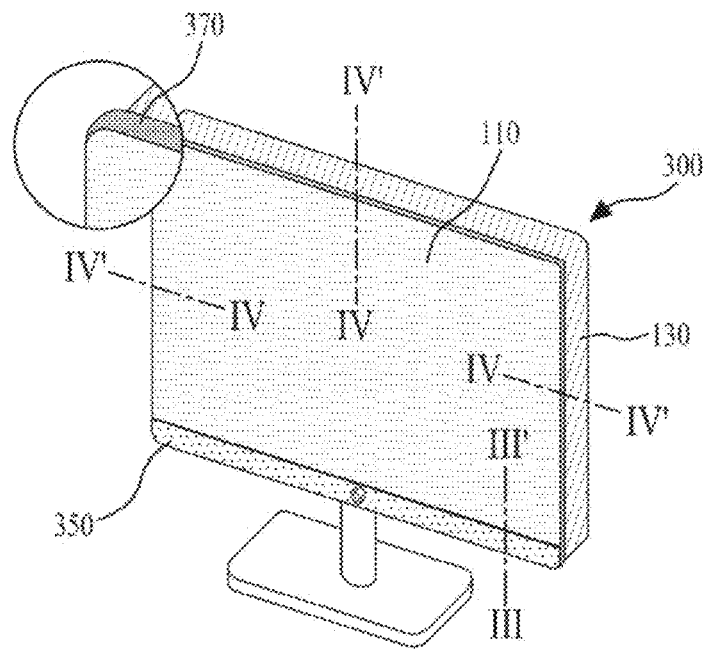
FIG. 8 illustrates an LCD device according to a second embodiment of the present invention.
Figure 9:
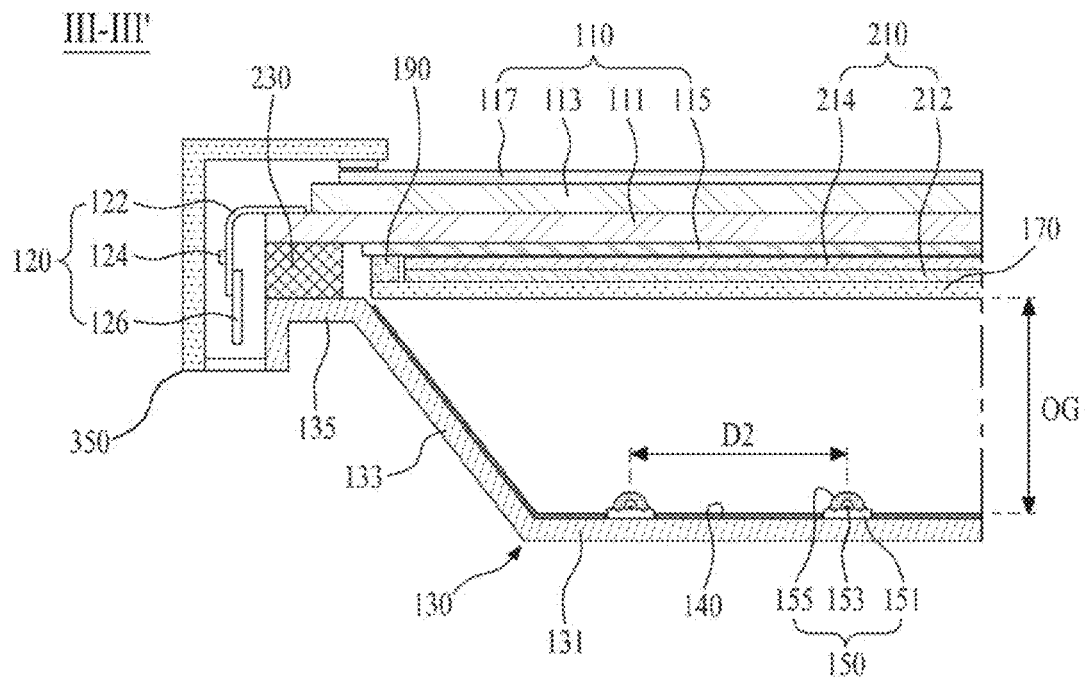
FIG. 9 is a cross-sectional view along line III-III' of FIG. 8.
Figure 10:
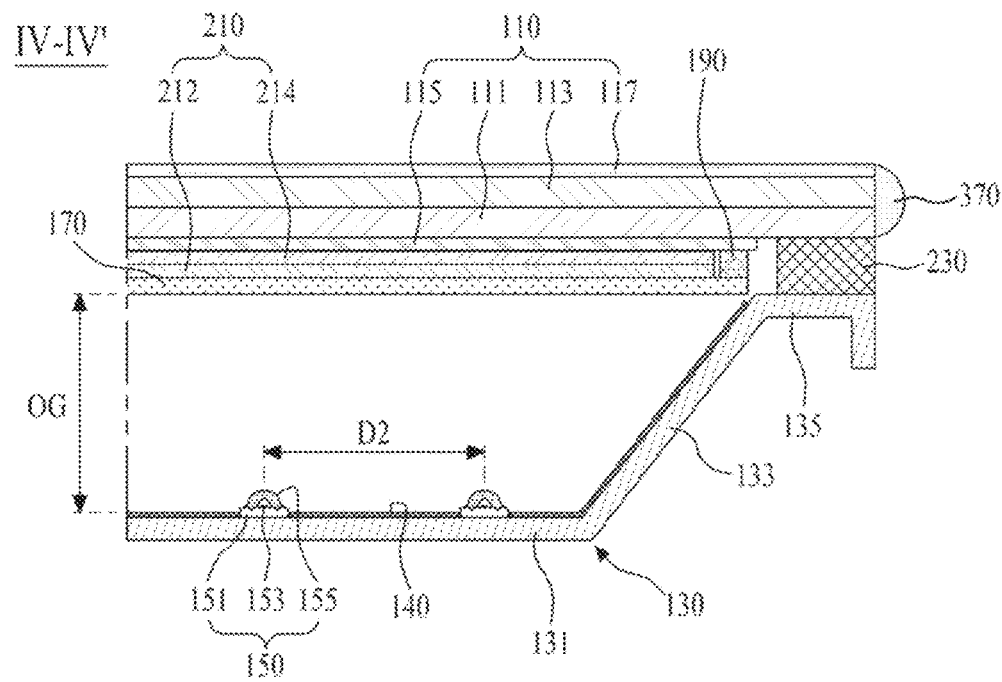
FIG. 10 is a cross-sectional view along line IV-IV' of FIG. 8.

FIG. 8 illustrates an LCD device according to the second embodiment of the present invention, FIG. 9 is a cross-sectional view along line III-III' of FIG. 8, and FIG. 10 is a cross-sectional view along line IV-IV' of FIG. 8.

Referring to FIGS. 8 to 10, the LCD device according to the second embodiment of the present invention may include a liquid crystal display panel 110, a rear cover 130, a plurality of light source modules 150, a diffusion sheet 170, a sheet attachment member 190, an optical sheet 210, a panel connection member 230, a deco cover 350, and an edge sealing member 370. The LCD device according to the second embodiment of the present invention constitutes a front surface of the liquid crystal display panel 110 as one flat surface by additionally removing the front cover from the LCD device according to the first embodiment of the present invention, whereby a bezel width becomes zero.

In the LCD device according to the second embodiment of the present invention, the other elements except the deco cover 350 and the edge sealing member 370 are the same as those of the LCD device according to the first embodiment of the present invention shown in FIGS. 2 to 7. Each of the deco cover 350 and the edge sealing cover 370 is used to cover the pad region of the display panel 110 and the panel driver, which are exposed externally as the front cover is removed, and is also used to protect sides of the display panel 110, which are exposed externally, from external impact and prevent side light leakage from occurring. In this respect, the deco cover 350 and the edge sealing member 370 will only be described hereinafter.

The deco cover 350 is formed to have a cross section in shape of "Γ", thereby covering a lower edge of the display panel 110 and the panel driver 120. Such a deco cover 350 is connected with the side of the rear cover 130, whereby the lower edge of the display panel 110, which includes a plurality of pad regions formed on the lower substrate 111, and the panel driver 120 are prevented from being exposed to the outside of the display LCD device.

The edge sealing member 370 is formed at the edge of the liquid crystal display panel 110 to have a fixed thickness and then surrounds the edge of the liquid crystal display panel 110. Such an edge sealing member 370 is formed to surround each of the upper edge, the left edge and the right edge of the liquid crystal display panel 110 except the lower side of the lower substrate 111 connected with the panel driver 120 of the liquid crystal display panel 110. In other words, the edge sealing member 370 may be formed to surround the side of the lower substrate 111, the side of the upper substrate 113, and the side of the upper polarizing film 117. Additionally, if the lower edge of the lower substrate 111 and the upper edge of the upper substrate 114 are processed by beveling, the edge sealing member 370 may be formed surround the beveling portion of each of the lower substrate 111 and the upper substrate 113. Particularly, in order to prevent separation of the upper polarizing film 117 from occurring as the front surface of the liquid crystal display panel 110 is exposed externally, the sides of the upper polarizing film 117 are cut by a laser cutting process to have an inclined surface while being spaced apart from each other at a fixed interval from the outer side of the upper substrate 113, and the edge sealing member 370 may be formed to partially cover the inclined surface of the upper polarizing film 117.

Although the edge sealing member 370 may be made of a silicon based or UV hardening based sealing material (or resin), it is preferable that the edge sealing member 370 is made of a UV hardening based sealing material considering process tack time. Also, although the edge sealing member 370 may have a color (for example, blue, red, blue-green or black), the edge sealing member 370 may be selected in accordance with design aspect of the liquid crystal display panel 110 without limitation to the color. Preferably, the edge sealing member 370 is made of a colored resin or light-shielding resin to prevent side light leakage of the liquid crystal display panel 110 from occurring due to internal total reflection of the lower substrate 112.

The aforementioned LCD device according to the second embodiment of the present invention may have the same advantage as that of the LCD device according to the first embodiment of the present invention and at the same time improve screen concentration of a user (or viewer) during image display as there is no element on the other front surface except the lower edge of the liquid crystal display panel 110.

Figure 11:
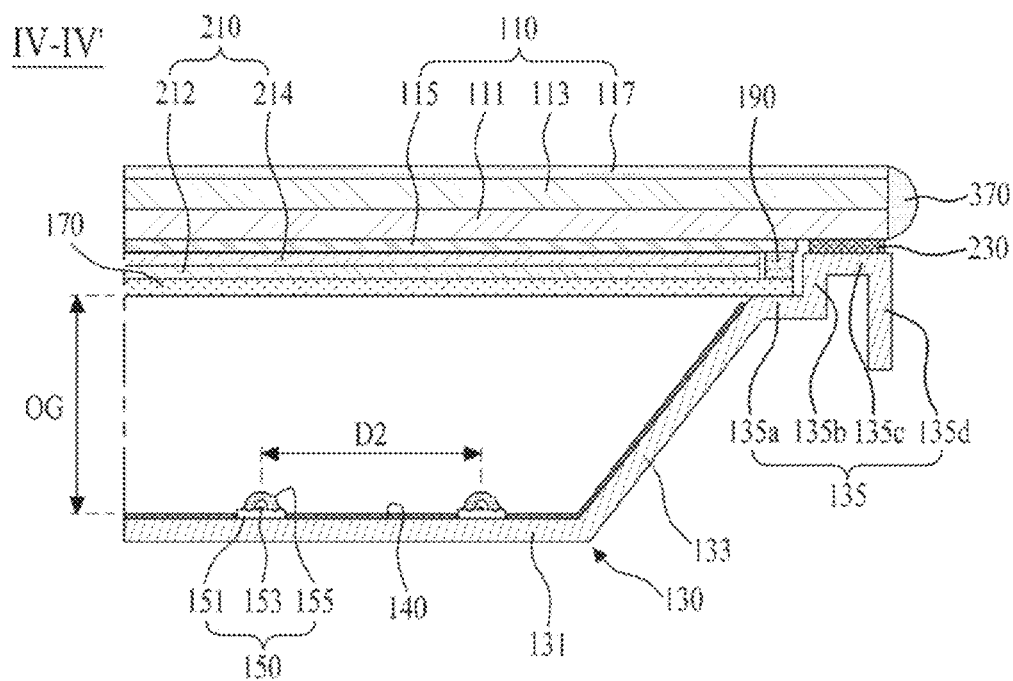
FIG. 11 illustrates a modified example of the LCD device according to the second embodiment of the present invention, which is obtained by changing the structure of a rear cover.

Meanwhile, in the LCD device according to the second embodiment of the present invention, as shown in FIG. 11, the upper supporter 135 of the rear cover 120 is formed in a step shape, and supports the lower edge of the diffusion sheet 170 attached to the liquid crystal display panel 110 and also supports the lower edge of the liquid crystal display panel 110. To this end, the upper supporter 135 may include a sheet support portion 135a, an upper sidewall 135b, and a panel support portion 135c. Since the upper supporter 135 is the same as that shown in FIG. 7, its repeated description will be omitted.

Figure 12:
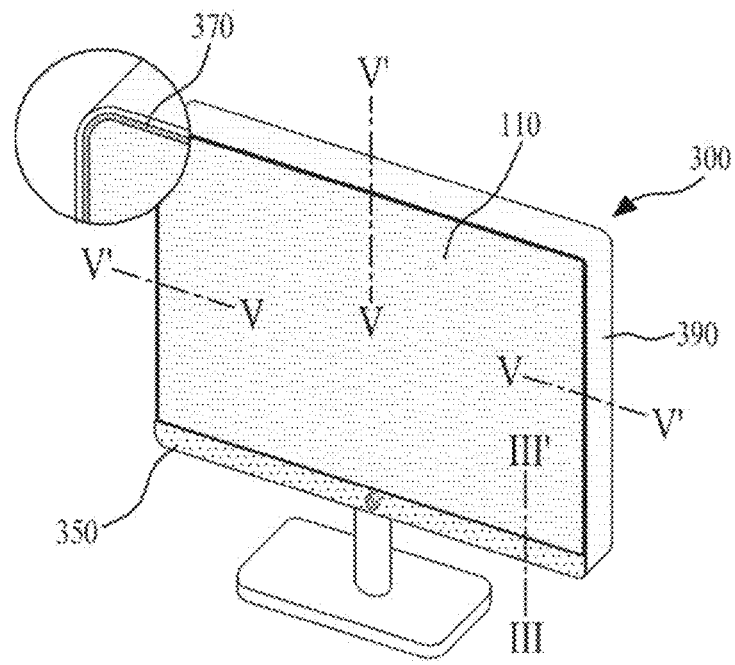
FIG. 12 illustrates an LCD device according to a third embodiment of the present invention.
Figure 13:
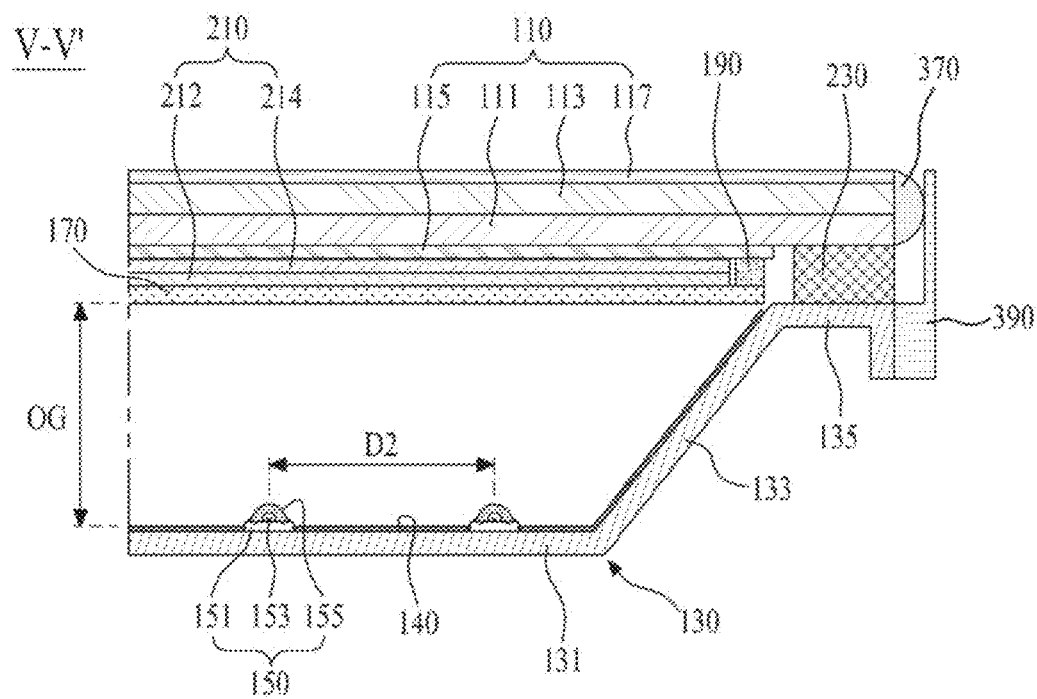
FIG. 13 is a cross-sectional view along line V-V' of FIG. 12.

FIG. 12 illustrates an LCD device according to the third embodiment of the present invention, and FIG. 13 is a cross-sectional view along line V-V' of FIG. 12. The LCD device according to the third embodiment of the present invention is provided in that an edge cover is additionally provided to the LCD device of the second embodiment of the present invention shown in FIGS. 9 to 11. The cross-sectional view along line III-III' of FIG. 12 is the same as that shown in FIGS. 8-11. Accordingly, the edge cover will only be described hereinafter.

The edge cover 390 is connected to the side of the rear cover 130 and surrounds the upper side, the left side and the right side of each of the rear cover 130 and the display panel 110 that includes the aforementioned edge sealing member 370 while not covering the front surface of the display panel 110, whereby the edge sealing member 370 and the panel connection member 230 are prevented from being exposed externally. Preferably, the edge cover 390 is formed at a thickness of 0.2 mm to 2 mm to minimize a bezel width of the display device.

Figure 14:
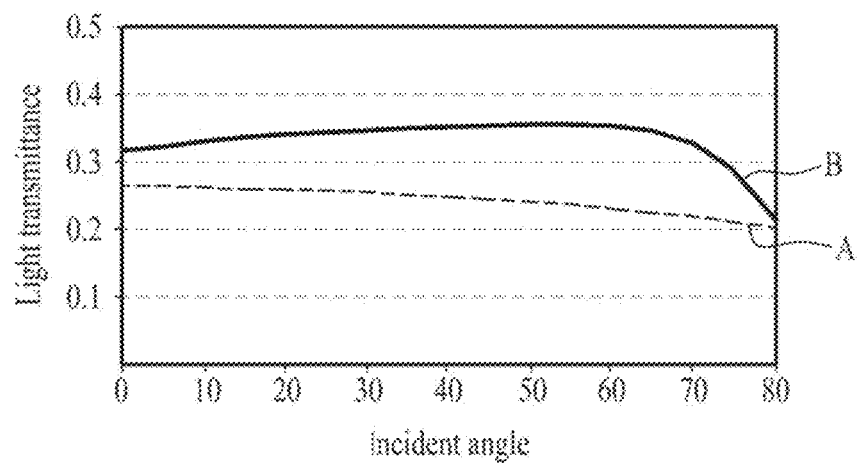
FIG. 14 is a graph illustrating light transmittance based on an incident angle of light in LCD devices according to the present invention and a comparison example.

FIG. 14 is a graph illustrating light transmittance based on an incident angle of light in LCD devices according to the present invention and a comparison example (related art LCD device). In this case, the LCD device of the comparison example may include a diffusion plate, a lenticular lens sheet, a prism sheet, and a diffusion sheet while the LCD device of the present invention may include a diffusion sheet and two lenticular lens sheets.

As illustrated in the graph A of FIG. 14, it is noted that the related art LCD device has low light transmittance if an incident angle of light which is incident on the diffusion plate is high. By contrast, as illustrated in the graph B of FIG. 14, it is noted that in the LCD device according to the embodiments of the present invention, light transmittance based on an incident angle of light which is incident on the diffusion sheet is higher than that of the related art LCD device.

Figure 15:
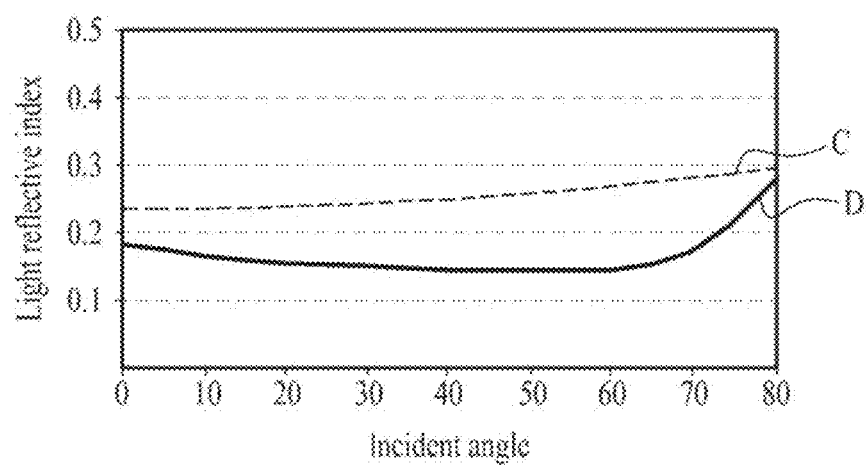
FIG. 15 is a graph illustrating light reflective index based on an incident angle of light in LCD devices according to the present invention and a comparison example.

FIG. 15 is a graph illustrating light reflective index based on an incident angle of light in LCD devices according to the present invention and a comparison example (related art LCD device). In this case, the LCD device of the comparison example may include a diffusion plate, a lenticular lens sheet, a prism sheet, and a diffusion sheet while the LCD device of the present invention may include a diffusion sheet and two lenticular lens sheets.

As illustrated in the graph C of FIG. 15, it is noted that light reflective index in the related art LCD device is increased if an incident angle of light which is incident on the diffusion plate is high. By contrast, as illustrated in the graph D of FIG. 15, it is noted that in the LCD device according to the embodiments of the present invention, light reflective index based on an incident angle of light which is incident on the diffusion sheet is lower than that of the related art LCD device.

Figure 16:
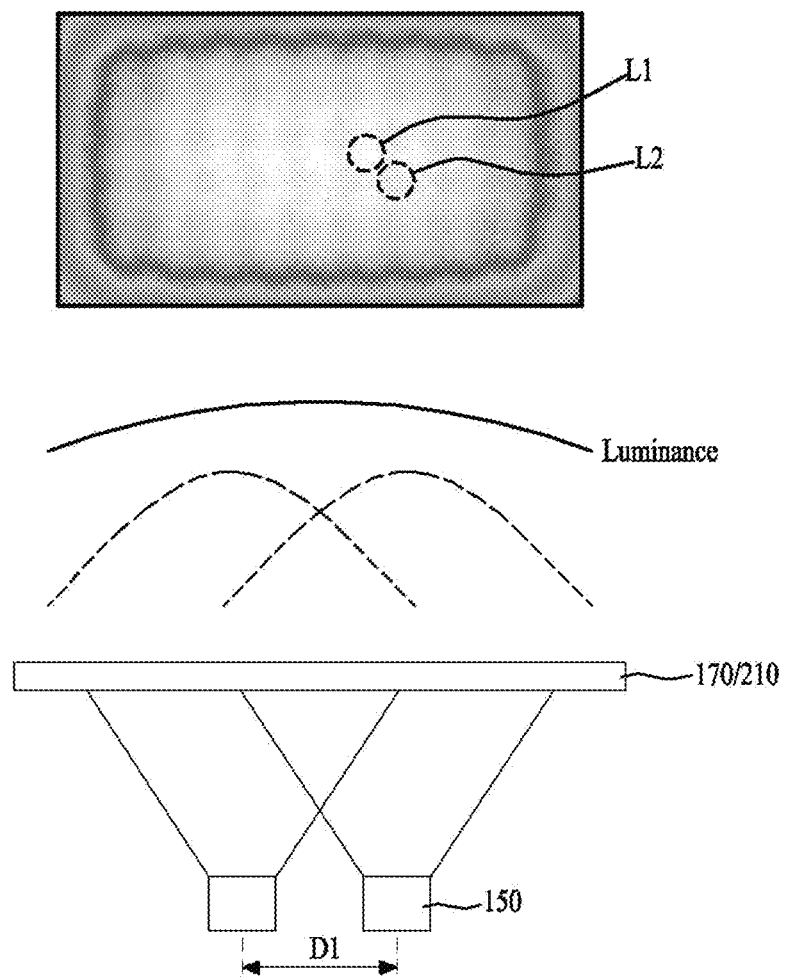
FIG. 16 illustrates luminance distribution of light source modules according to a first interval of adjacent light source modules in an LCD device according to the present invention.

Since light transmittance is high and light reflective index is low at the high incident angle in the LCD device according to the present invention as shown in FIGS. 14 and 15, luminance L1 between the adjacent light source modules 150 arranged at the first fixed interval D1 becomes high and upper luminance L2 of the light source modules 150 becomes low as shown in FIG. 16. A mura defect may occur due to the difference in luminance L1, L2. This mura defect means that the second interval D2 between adjacent light source modules 150 may be widened.

Figure 1:
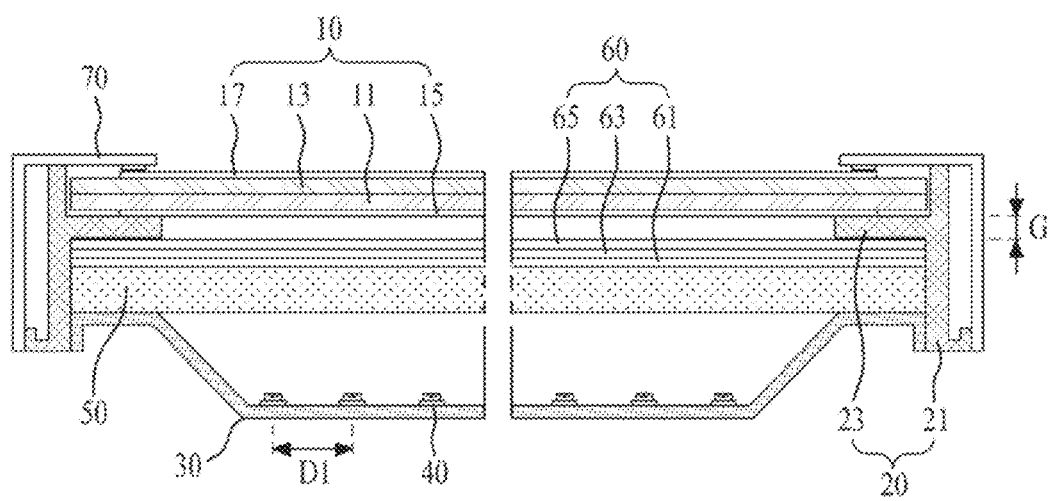
FIG. 1 is a cross sectional view illustrating a related art LCD device.
Figure 17:
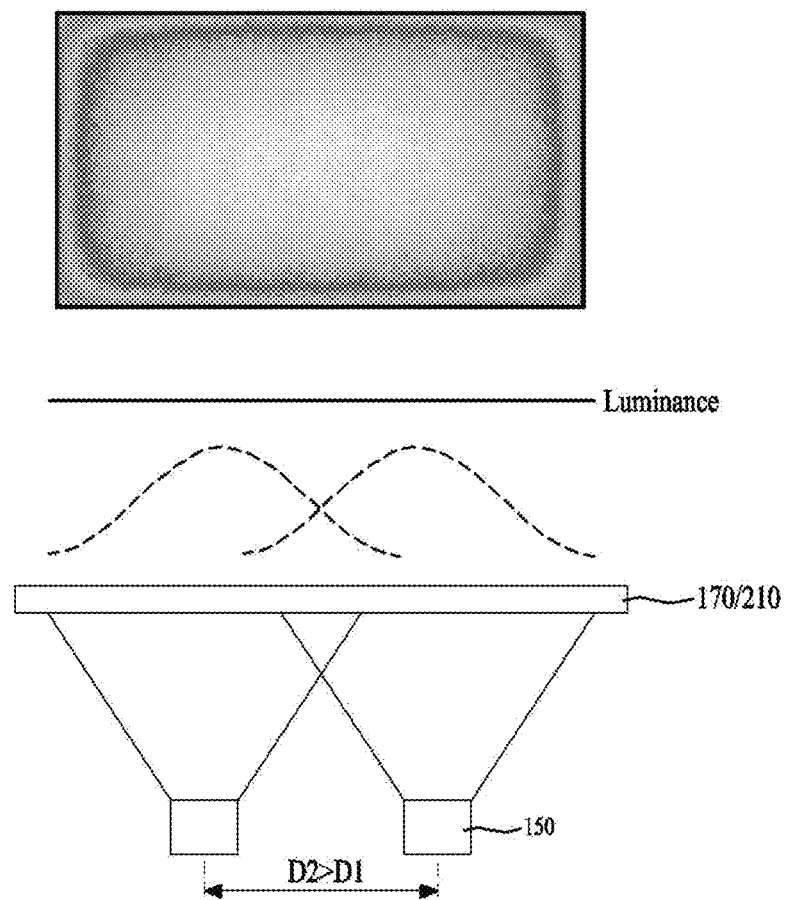
FIG. 17 illustrates luminance distribution of light source modules according to a second interval of adjacent light source modules in an LCD device according to the present invention.

Accordingly, the present invention may reduce the number of light source modules 150 by widening the interval (D2>D1) between the adjacent light source modules 150. At this time, the interval (D2>D1) between the adjacent light source modules 150 is set such that luminance distribution of light, which has been emitted from one light source module 150 and then has been transmitted to the optical sheets, may have Gaussian function form as shown in FIG. 17. In this case, it is preferable that a full width at half maximum of the Gaussian function is set to be greater than a value (D2/ln(2)) obtained by dividing the second interval D2 between the adjacent light source modules 150 by a natural log value of 2 (ln(2)). Accordingly, the present invention may increase the aforementioned optical gap (OG) as much as the removed gap space (G) and the removed guide panel in the related art LCD device shown in FIG. 1, and may uniformly maintain luminance of the liquid crystal display panel while reducing the number of light source modules 150 by optimizing the interval (D2>D1) between the adjacent light source modules 150 in accordance with the full width at half maximum of the Gaussian function.

As described above, according to one or more embodiments of the present invention, the following advantages can be obtained.

First of all, since the relatively-thin diffusion sheet is attached to the liquid crystal display panel, and the liquid crystal display panel to which the diffusion sheet is attached is connected to the rear cover, whereby the guide panel and the diffusion plate which are the essential elements of the LCD device may be removed. Accordingly, the number of structural and optical components may be reduced, whereby the structure and manufacturing process of the LCD device may be simplified.

Second, since the LCD device of the present invention does not include the relatively-thick diffusion plate, it is possible to prevent Mura defects caused by the contact between the liquid crystal display panel and the optical sheet in accordance with the thermal expansion.

Finally, as the guide panel and the diffusion plate are removed, the optical gap between the diffusion sheet and the light source module is increased to reduce the number of the light source modules, whereby the manufacturing cost may be reduced.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:

1. A liquid crystal display (LCD) device comprising:
   a liquid crystal display panel that includes a lower substrate and an upper substrate bonded to each other with a liquid crystal layer interposed therebetween;
   a rear cover that includes a bottom supporter supporting a light source module emitting light toward a bottom of the liquid crystal display panel, an upper supporter supporting a lower edge of the liquid crystal display panel, and a sidewall between the bottom supporter and the upper supporter;
   a diffusion sheet arranged below the liquid crystal display panel to cover the bottom supporter of the rear cover;
   a sheet attachment member attached to an edge of the diffusion sheet and attached to the bottom of the liquid crystal display panel;
   an optical sheet arranged between the liquid crystal display panel and the diffusion sheet; and
   a panel connection member attached to the lower edge of the liquid crystal display panel and the upper supporter of the rear cover,
   wherein a gap exists between the sheet attachment member and the optical sheet.

2. The LCD device of claim 1, wherein the liquid crystal display panel further includes a lower polarizing film attached to a bottom of the lower substrate, and
   wherein the sheet attachment member is attached to an edge of the lower polarizing film.

3. The LCD device of claim 1, wherein the sheet attachment member is provided at the edge of the diffusion sheet in shape of a closed loop so that a sealing space is provided between the diffusion sheet and the liquid crystal display panel.

4. The LCD device of claim 1, wherein the panel connection member is connected to a lower edge of the lower substrate of the liquid crystal display panel and is also connected to the upper supporter of the rear cover.

5. The LCD device of claim 1, wherein each of the sheet attachment member and the panel connection member is a photocurable adhesive, thermosetting adhesive, double-sided tape, or double-sided adhesive pad.

6. The LCD device of claim 1, wherein the optical sheet includes at least one of a prism sheet having a prism pattern, a lenticular lens sheet having a lenticular lens pattern, and a micro lens sheet having a micro lens pattern.

7. The LCD device of claim 1, wherein the upper supporter of the rear cover includes:
   a sheet support portion supporting the edge of the diffusion sheet;
   an upper sidewall bent from the sheet support portion, surrounding sides of the diffusion sheet; and
   a panel support portion provided above the upper sidewall and connected to the panel connection member.

8. The LCD device of claim 1, further comprising a front cover surrounding a front edge of the liquid crystal display panel and a side of the rear cover.

9. The LCD device of claim 1, further comprising:
   a panel driver connected to a pad region provided at an edge at one side of the lower substrate;

a deco cover covering an edge at one side of the liquid crystal display panel and the side of the liquid crystal display panel, which corresponds to the edge at one side of the lower substrate; and an edge sealing member covering the other sides except the edge at one side of the liquid crystal display panel.

10. The LCD device of claim 9, further comprising an edge cover connected to the side of the rear cover to cover the edge sealing member without covering a front surface of the liquid crystal display panel.

11. A liquid crystal display (LCD) device, which includes a rear cover provided with a light source module emitting light, a diffusion sheet covering the rear cover, an optical sheet arranged on the diffusion sheet, and a liquid crystal display panel arranged on the optical sheet, the LCD device comprising:

a sheet attachment member attached to an edge of the diffusion sheet and also attached to a bottom of the liquid crystal display panel; and a panel connection member attached to a lower edge of the liquid crystal display panel and the rear cover, wherein the diffusion sheet is attached to the liquid crystal display panel by the sheet attachment and supports the optical sheet, wherein a gap exists between the sheet attachment member and the optical sheet.

12. The LCD device of claim 11, wherein the liquid crystal display panel further includes lower and upper substrates bonded to each other with a liquid crystal layer interposed therebetween and a lower polarizing film attached to the lower substrate, and wherein the diffusion sheet is attached to the lower polarizing film by the sheet attachment member.

13. The LCD device of claim 12, wherein the rear cover is connected to a lower edge of the lower substrate by the panel connection member.

14. The LCD device of claim 11, further comprising an edge sealing member covering the other sides except an edge at one side of the liquid crystal display panel.

15. A liquid crystal display (LCD) device comprising:

a liquid crystal display panel that includes a lower substrate and an upper substrate bonded to each other with a liquid crystal layer interposed therebetween;

a rear cover that includes a bottom supporter supporting a light source module emitting light toward a bottom of the liquid crystal display panel, an upper supporter supporting a lower edge of the liquid crystal display panel, and a sidewall between the bottom supporter and the upper supporter;

a diffusion sheet arranged below the liquid crystal display panel to cover the bottom supporter of the rear cover;

a sheet attachment member attached to an edge of the diffusion sheet and attached to the bottom of the liquid crystal display panel;

an optical sheet arranged between the liquid crystal display panel and the diffusion sheet; and a panel connection member attached to the lower edge of the liquid crystal display panel and the upper supporter of the rear cover, wherein each of the sheet attachment member and the panel connection member is a photocurable adhesive, thermosetting adhesive, double-sided tape, or double-sided adhesive pad.

16. A liquid crystal display (LCD) device, which includes a rear cover provided with a light source module emitting light, a diffusion sheet covering the rear cover, an optical sheet arranged on the diffusion sheet, and a liquid crystal display panel arranged on the optical sheet, the LCD device comprising:

a sheet attachment member attached to an edge of the diffusion sheet and also attached to a bottom of the liquid crystal display panel;

a panel connection member attached to a lower edge of the liquid crystal display panel and the rear cover, wherein the diffusion sheet is attached to the liquid crystal display panel by the sheet attachment and supports the optical sheet; and an edge sealing member covering the other sides except an edge at one side of the liquid crystal display panel.

* * * * *